(12) United States Patent
Gopal et al.

(10) Patent No.: US 6,360,217 B1
(45) Date of Patent: Mar. 19, 2002

(54) METHOD AND COMPUTER PROGRAM PRODUCT FOR CALCULATING EVENT OCCURRENCES

(75) Inventors: Burra Gopal; Kok Wai Chan, both of Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/296,006

(22) Filed: Apr. 21, 1999

(51) Int. Cl.[7] .............................................. G06F 17/30
(52) U.S. Cl. ................................ 707/3; 707/1; 345/751
(58) Field of Search ............................... 707/7, 2, 6, 4, 707/1, 3; 345/329–331, 751

(56) References Cited

U.S. PATENT DOCUMENTS

| | | | | |
|---|---|---|---|---|
| 5,864,848 A | * | 1/1999 | Horvitz et al. | 707/6 |
| 5,999,938 A | * | 12/1999 | Bliss et al. | 707/102 |
| 6,047,297 A | * | 4/2000 | Johnson et al. | 707/530 |
| 6,092,067 A | * | 7/2000 | Girling et al. | 707/100 |
| 6,216,110 B1 | * | 4/2001 | Silverberg | 705/9 |

OTHER PUBLICATIONS

Tereniani, Integrating Calendar Dates and Qualitative Temporal Constraints in the Treatment of Periodic Events, Knowledge and Data Engineering, IEEE Transactions on vol. 95, Sep.–Oct. 1997, pp. 763–783.*

Biswas et al., Distributed Scheduling of Meetings: A Case Study in Prototyping Distributed Applications, IEEE, Systems Integration, 1992. ICSI '92., Proceedings of the Second International Conference on, 1992, pp. 656–665.*

Higa et al., Meeting Scheduling: An Experimental Investigation, Systems, Man and Cybernetics, 1996., IEEE International Conference on vol. 3, 1996, pp. 2023–2028 vol. 3.*

Gordon, Using Microsoft Outlook 98, QUE, 1998, electronic version (http://www.netLibrary.com) pp. 419–435, 439–449, and 458.*

\* cited by examiner

Primary Examiner—Hosain T. Alam
Assistant Examiner—Joon H. Hwang
(74) Attorney, Agent, or Firm—Workman, Nydegger, Seeley

(57) ABSTRACT

A method for calculating all event occurrences defined by an event expression in a specified time window. An event expression comprises add rules, delete rules and modify rules, each of which define a set of rule occurrences. The rules are separated into three groups and the occurrences generated by the grouped rules are sorted in any desired manner such that the earliest occurrence of each group is available for processing. A heap sort algorithm represents one suitable sorting technique. The earliest add rule occurrence is retrieved from the sorted add group occurrences and is compared with the earliest modify and delete rule occurrences taken from the sorted modify and delete group occurrences, respectively. Based on priority rules applied to the add, modify, and delete rule occurrences during the comparison process, it may be determined that the add rule occurrence represents a valid event occurrence that satisfies the event expression. Meanwhile, the add, modify, and delete rule occurrences are refreshed and resorted as the next rule occurrences associated with the grouped rules are calculated. The process is repeated until all valid event occurrences within the specified time window are found.

33 Claims, 7 Drawing Sheets

METHOD AND COMPUTER PROGRAM PRODUCT FOR CALCULATING EVENT OCCURRENCES

BACKGROUND OF THE INVENTION

1. The Field of the Invention

The present invention relates to methods for calculating dates and times. More specifically, the present invention relates to methods used to calculate dates and times at which events occur within a specified time period based on user defined rules and exceptions.

2. The Prior State of the Art

Computers are becoming commonplace, and they have begun to replace many different everyday items. Word processing programs are replacing typewriters and spreadsheets are used instead of calculators. Similarly, programs capable of maintaining calendaring and scheduling information are replacing daybooks and planners. Calendaring and scheduling programs provide a user with a variety of related applications. Typically, a calendaring application has an address book, means to send and receive email, a journal and a task list, which help users automate their daily responsibilities and activities.

With regard to dates and times, the most important feature of a scheduling program is the calendar. The calendar can be viewed in various modes which may include daily, weekly, monthly or yearly. Many programs allow the user to specify the time window (i.e., a selected number of days, weeks, etc.) that is displayed to the user. For example, each day can be shown on a computer screen, and the user is presented with various options, which may include scheduling an appointment, setting an alarm or making a reminder. Calendar programs often permit a user to add notes or text such that the information is viewed and associated with a particular day and/or time.

It is well known that many appointments or dates occur repeatedly. For example, a business may hold a monthly managerial meeting at a certain place. Using current calendaring technologies, a user would have to manually input all information associated with each monthly meeting into the proper location in the calendar. This technique for scheduling appointments or meetings is not unlike a dayplanner where the user must actually write the information in each appropriate date.

Conventionally, appointments, meetings and related events have been entered into a corresponding calendaring application by physically editing and/or entering each respective event occurrence. The Internet Calendaring and Scheduling Core Object Specification (iCalendar), provides a syntax language for specifying an event definition expression that includes rules and exceptions that define recurring "events" that would typically be included within a calendar or scheduling-type application. For instance, a user can write an event expression that includes a rule stating that a meeting will occur on the Thursday of the last week of every month. In addition, the user can include within the expression one or more exceptions to the primary rule. For example, the above rule can be modified to exclude those Thursdays that occur in the months of July and November. Furthermore, the user can specify a modify rule. For instance, in the above example, the user could specify that if any of the Thursdays fall on the $27^{th}$, then the meeting should instead be held on the previous Thursday.

Although the iCalendar syntax can be used to formulate rules and exceptions that define recurring events, it does not provide methods and systems for processing the rules and exceptions to generate the specific times and dates at which the events occur. In other words, the iCalendar syntax has not been associated with an efficient engine that can be used to convert iCalendar rules and exceptions to times and dates.

In view of the foregoing, there is a need in the art for systems and methods for processing expressions that define recurring events to yield the times and dates associated with the occurrences of the events. It would be advantageous if such systems and methods could process expressions that are written in an iCalendar syntax or any other available format. It would be particularly useful to provide systems and methods for generating the times and dates associated with expressions having any desired level of complexity, including those that impose various conditions on the dates and times of the events and those that have multiple rules, exceptions, and modifications.

SUMMARY AND OBJECTS OF THE INVENTION

The present invention relates to generating times and dates based on an expression defining an event. The invention can be applied to event expressions that have any number or combination of rules, including rule exceptions and modifications. For example, given an expression defining a recurring event, the systems and methods of the invention can be used to generate the specific times and dates on which occurrences of the events fall. The times and dates generated according to the invention can be used by calendar, scheduling, and other applications. Moreover, the methods for generating the times of events efficiently use computer processing and memory resources.

The general process for calculating times and dates is conducted, for example, when a computer user or an application program requests specific times and dates that are defined by the event expression. The event expression, which can be written in the iCalendar syntax or another defined language, includes the rules, rule exceptions and/or rule modifications that define a recurring event or events. A time window is associated with the event expression, and defines the time period in which the times and dates of the event occurrences are to be calculated. For example, the user may specify that the times and dates of the occurrences of the events are to be calculated during a given calendar year.

According to one aspect of the invention, the overall event expression is parsed into individual rules and exceptions that are assigned to one of three groups or categories: (1) rules and exceptions that add one or more event occurrences (an "add" rule group); (2) exceptions that modify one or more occurrences (a "modify" rule group); and (3) exceptions that delete one or more occurrences (a "delete" rule group).

With the rules and exceptions assigned to the foregoing groups, successive occurrences of each rule and exception are calculated. The occurrences can be identified using two cooperating procedures referred to as the "get-first" and "get-next" procedures. In particular, the get-first and get-next procedures compute the time and date of the first occurrence and successive occurrences thereafter for each of the rules and exceptions within the groups. When an event occurrence is calculated, it is placed in a sorting data structure associated with the group (i.e., the add, modify, or delete groups) to which the corresponding rule or exception was assigned. In this manner, the times and dates of event occurrences associated with the rules and exceptions are sorted chronologically and allocated to the three groups.

As the occurrences corresponding to the rules and exceptions are calculated and sorted as described above, they are merged to generate the times and dates defined by the overall event expression. The process of merging involves analyzing the occurrences generated for the add group using priority rules to determine whether the add rule occurrences should be deleted in view of a delete rule occurrence, modified based on a modify rule occurrence, or instead designated as an event occurrence defined by the overall event expression. If an add rule occurrence coincides with a delete rule occurrence, it does not represent the time and date of an event defined by the overall event expression. If the add rule occurrence does not coincide with a delete rule occurrence, but instead coincides with a modify rule occurrence, the modify rule occurrence is designated as an event occurrence defined by the overall event expression. Moreover, if the add rule occurrence does not coincide with a delete rule occurrence or a modify rule occurrence, the add rule occurrence represents an event occurrence defined by the overall event expression.

Generating times and dates occurring in a specified time window and defined by an event expression according to the invention is efficient because the sorting and merging of occurrences is accomplished one-by-one as needed (i.e., occurrences are sorted and merged on the fly), instead of computing and sorting all of the occurrences in the specified time window for each group fully before they are merged together. Thus, the systems and methods of the invention can be implemented in computer systems without consuming significant computing resources.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention addresses the problem of calculating the occurrences, or dates and times associated with event occurrences defined by an event expression. The present invention relieves the user of having to manually enter and edit each event occurrence. The process of calculating event occurrences involves processing the event expression, which can be as simple or complex as desired. The event occurrences generated according to the invention can be conveniently used with calendar, scheduling, or other software applications.

Exemplary Computing Environment

The present invention is described in terms of diagrams and flow charts. Using the diagrams and flow charts in this manner to present the invention should not be construed as limiting its scope. Embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
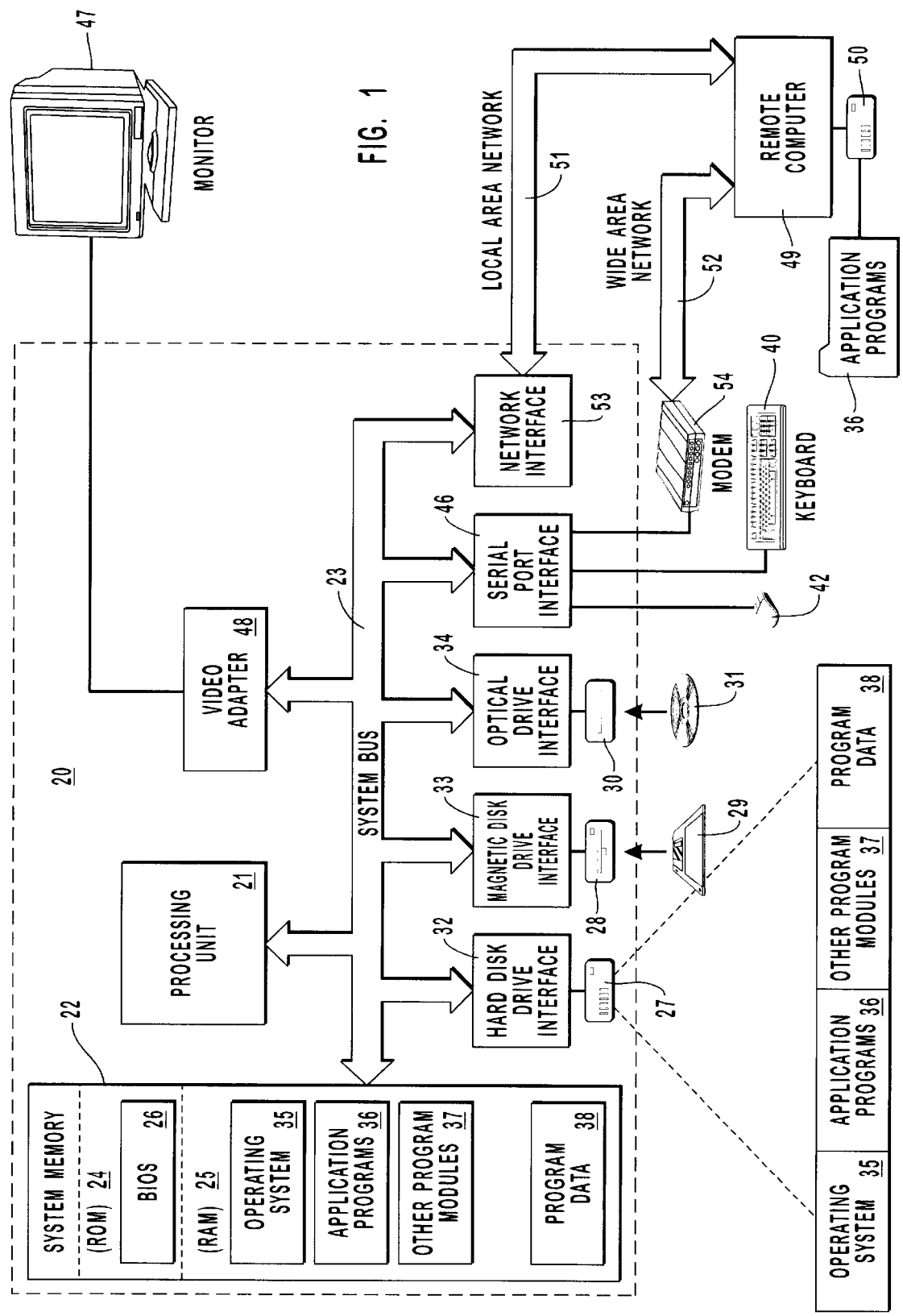
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Event Expressions and Rules

Various terms used in the description of the present invention are defined hereinafter. As used herein, the term "event expression" refers to a computer-readable definition specifying when a single or a recurring event is to occur. In general, event expressions include information that permits the times and/or dates when the events occur to be calculated, without exhaustively listing the time and date of each occurrence. Event expressions and their component rules are formatted using a syntax that allows the events to be processed according to the techniques disclosed herein. While the invention can be practiced with event expressions that are encoded in any number of formats, including those that are understood by those skilled in the art at the time the invention was made and those that may be developed in the future. One example of a suitable syntax is the iCalendar syntax. The following expression represents an event expression encoded in the iCalendar format:

E1) DTSTART; TZID=US-Eastern:19961105T09000
    RRULE: FREQ=YEARLY; INTERVAL=4;
       BYMONTH=11; BYDAY=TU;
       BYMONTHDAY=2, 3, 4, 5, 6, 7, 8.

This iCalendar embodiment of an event expression corresponds to the following natural language event definition:

E1) Every four years, the first Tuesday after a Monday in November starting on Nov. 5, 1996, forever.

Event expression E1 describes recurring instances of the United States presidential election in a specified time window.

In the following description, event definitions and expressions are generally presented in natural language statements for purposes of illustration. However, when event expressions, such as those disclosed herein, are processed using the methods and systems of the invention, the event expressions are encoded using a computer-readable syntax or format that is compatible with the particular embodiments of the invention.

The following natural language representation of event expression E2 is presented for purposes of illustration:

E2) Every third Friday of the month and every Monday, beginning Jul. 6, 1998, until the year 2010, except those that occur on the 20$^{th}$ of the month. Those that would occur on the 15$^{th}$ of the month shall instead occur on the 16$^{th}$ of the month. Add the occurrence on Jul. 4, 2001.

As used herein, the term "event" extends to times or dates and also extends to appointments, meetings, or other activities that are to be conducted at the times or dates. The term "event occurrence" refers to a time and/or date that satisfies a particular event expression. It is also noted that the term "time", as used herein, can refer to times of day, dates, and any other such measure of when an event occurs.

Each event expression can be parsed into at least one rule. Parsing an event expression can include extracting rules from an event expression, organizing the rules into groups, and/or selecting for the rules a format or syntax that is compatible with the processing steps that are to be used to calculate the date and time of the event occurrences defined by the rules. The invention can be practiced by obtaining one or more rules that are associated with or that represent an event expression, regardless of where or how the event expression is parsed, and regardless of the source of the one or more rules.

A rule represents a portion of an event expression that defines or partially defines when an event is or is not to occur. Rules can be classified in two broad groups: affirmative rules and exceptions. An affirmative rule is a rule that defines when an event is to occur and that could stand alone as an event expression. Event expression E2 includes two rules, namely:

R1) Every third Friday
R2) Every Monday

Each rule in an event expression defines rule occurrences. For instance, Jul. 6, 13, 20, and 27 of 1998 are only a few of the rule occurrences associated with affirmative rule R2. Each rule occurrence associated with an affirmative rule is a potential event occurrence, in the sense that it might be determined to be an event occurrence that satisfies an overall event expression, but also might be overruled or modified by an exception. As used herein, "exception" refers to a rule in an event expression that deletes or modifies an affirmative rule occurrence or that adds one or a finite number of occurrences to those that would otherwise be defined by the affirmative rules. There are at least three general types of exceptions: add exceptions, modify exceptions, and delete exceptions, represented by the following examples, respectively:

R3) Add the occurrence on Jul. 4, 2001.
R4) Those that would occur on the 15$^{th}$ of the month shall instead occur on the 16$^{th}$ of the month.
R5) Except those that occur on the 20$^{th}$ of the month.

Add exceptions add one or a finite number of event occurrences to those otherwise defined by affirmative rules. Modify exceptions modify one or more affirmative rule occurrences. Delete exceptions delete one or more affirmative rule occurrences.

An event expression can also have associated properties, which describe and give context to events in ways other than describing the time and date on which an event is to occur. For example, a property of an event might be its location, participants, description and the like. Although the use of properties in connection with events is not necessary, they can advantageously describe events and present the events to the user in meaningful ways. For example, if an event expression defines a meeting on the first Monday of each month and the properties contain the location and the names of persons who will attend the meetings a calendaring application used with the invention can display this information to the user.

Figure 2A:
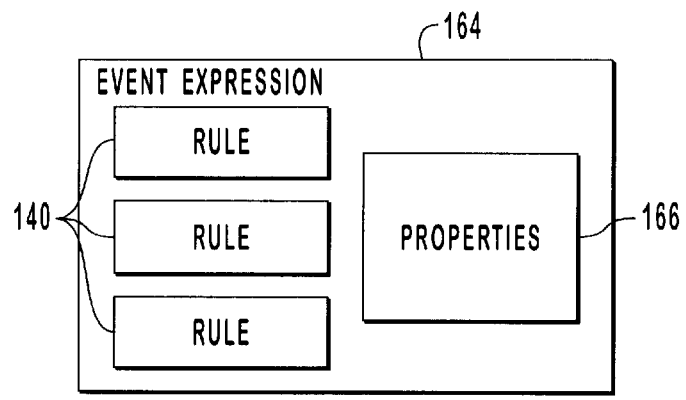
FIG. 2a is a diagram of a data structure representing an event expression.
Figure 2B:
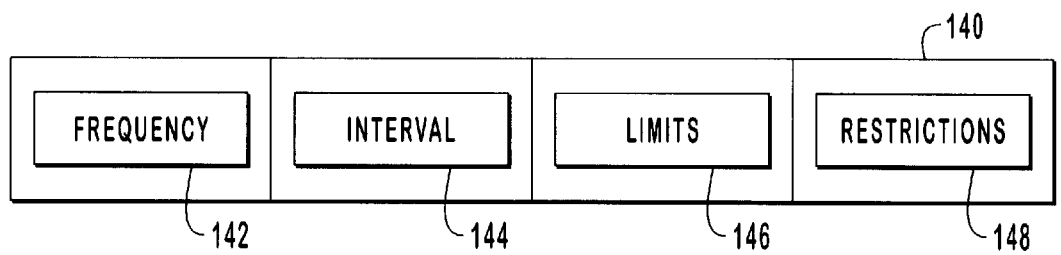
FIG. 2b is a diagram of a data structure representing an individual rule.

FIGS. 2a and 2b illustrate data structures, including an event expression and associated rules, that can be processed according one embodiment of the invention to generate one or more times at which an event occurs. The invention can be practiced using event expressions having formats other than those depicted in FIGS. 2a and 2b.

In order to illustrate how rules 140 and event expression 164 define the occurrences of an event, the following natural language event definition is presented as an example:

E3) Schedule a meeting in room B101 every seven days at 1:00 p.m. and every third Thursday of each month at 10:00 a.m., except on the 15$^{th}$ of any month, beginning on Dec. 14, 1998, for two years.

Event expression 164 of FIG. 2a represents an event definition, such as event definition E3, having been encoded in a computer-readable data structure according to a defined format. Event expression 164 can include, according to this embodiment, rules 140 and properties 166. The exemplary event definition E3 has three rules:

R6) Every seven days at 1:00 p.m.
R7) Every third Thursday of each month at 10:00 a.m.
R8) Except on the 15$^{th}$ of any month.

Rules R6 and R7 are affirmative rules and rule R8 is an exception.

The exemplary event definition E3 has two properties P1 and P2 that define the nature of the event that is to occur at the defined times. The properties describe the events in meaningful ways for the user or software application to which the times of the event occurrences may be provided:

P1) A meeting.
P2) In room B101.

When an event definition, such as event definition E3, is encoded in the data structure represented by event expression 164, rules 140 can be expressed and formatted as shown in FIG. 2b. Rule 140 or FIG. 2b has four types of data fields that represent irreducible portions of the definition embodied in the rule. In particular, rule 140 includes the data fields designated as frequency 142, interval 144, limits 146, and restrictions 148. The nature of these data fields can be understood by making reference to rules, namely, affirmative rules R6 and R7 selected from the exemplary event definition E3:

R6) Every seven days at 1:00 p.m.
R7) Every third Thursday of each month at 10:00 a.m.

Frequency 142 represents the basic unit of time with which the event occurrences associated with rule 140 are described. Frequency 142 can be yearly, weekly, daily, hourly, per minute or per second or any other unit of time. Rule R6 has a daily frequency 142, while rule R7 has a weekly frequency. Interval 144 is closely associated with frequency 142, and represents the number of units of time between event occurrences. Rule R6 has an interval 144 of seven (days), whereas rule R7 has an interval of four or five (weeks), depending on the particular month.

Limits 146 define the time window or the period of time in which the times and dates of the event occurrences are to be calculated. In particular, limits 146 specify a start time, such as a specific date, at which the event occurrences calculated according to the invention are to begin. Furthermore, limits 146 can include an end time, or other information indicating the duration or end of the period of time in which the times and dates of the event occurrences are to be calculated. Referring again to the exemplary event definition E3, rules R6 and R7 both have, as their limits 146, a computer-readable version of the expression "beginning on Dec. 14, 1998, for two years." Thus, limits 146 of rules R6 and R7 define the start time (i.e., Dec. 14, 1998) and the end time (i.e., Dec. 14, 2000) of the time period in which event occurrences are to be identified. Limits 146 can optionally be defined by a specified number of events that are to be calculated instead of by a defined length of time. Alternatively, limits 146 can be open ended, such as in the expression "beginning today, forever." In this case, the systems and methods of the invention can employ a default end time so as to avoid attempting to calculate the times of an infinite number of event occurrences.

Rule 140 comprises restrictions 148, which further define the times and dates on which events are to occur. Restrictions 148 can perhaps be best understood by referring to specific examples thereof. The restriction 148 included in rule R6 is "1:00 p.m." With respect to rule R6, the expression "1:00 p.m." restricts the occurrence of events otherwise defined by the daily frequency 142 and seven-day interval 144 to a specific hour of the day. Rule R7 has three restrictions 148, namely, "third", "Tuesday" and "10:00 a.m." The foregoing expressions restrict the event occurrences to a specific week of the month, day of the week, and hour of the day, respectively. In general, restrictions 148 can have any desired granularity, including month of the year, week of the year, day of the month, day of the week, hour of the day, minutes of the hour, or second of the minute. Some rules do not have restrictions 148. For instance, consider the rule:

R9) Every day, beginning today.

Rule R9 has an frequency 142 (daily), an interval 144 (one), but no restrictions 148.

As previously noted, the event expression representing event definition E3 includes one exception:

R8) Except on the 15$^{th}$ of any month.

Exceptions can have the same basic structure (i.e., frequency 142, interval 144, limits 146, and restrictions 148) as that of affirmative rules. For instance, exception R8 has a monthly frequency, an interval of one (month), limits that are the same as those of rules R6 and R7, and a restriction that the exception occurrence is on the 15$^{th}$ of the month.

Reference is now made to event definition E1:

E1) Every four years, the first Tuesday after a Monday in November starting on Nov. 5, 1996, forever.

Event definition E1 is a natural language statement that describes the United States presidential election in a specified time window. In the iCalendar format, event definition E1 can be encoded in an event expression as follows:

E1) DTSTART; TZID=US-Eastern:19961105T09000
    RRULE: FREQ=YEARLY; INTERVAL=4;
    BYMONTH=11; BYDAY=TU;
    BYMONTHDAY=2, 3, 4, 5, 6, 7, 8.

Frequency 142 of event expression E1 is yearly and interval 144 is four (years). Thus, the event occurrences defined by the above rule occur once every 4 years. Limits 146 of the above rule include a start time of Nov. 5, 1996, but do not designate a specific end date. Restrictions 148 restrict the event occurrences to the first Tuesday after a Monday in November.

Get First I/Get Next I Program Modules

Figure 3A:
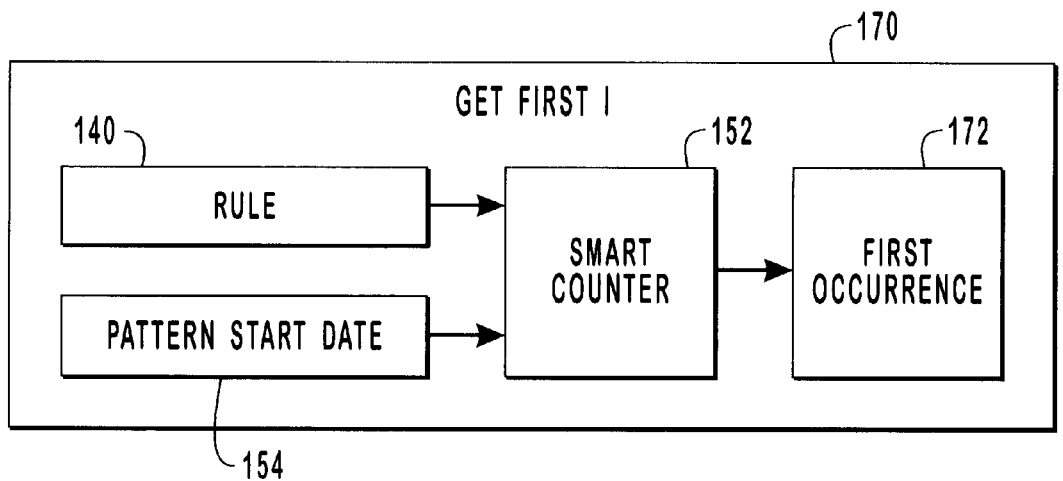
FIG. 3a is a schematic diagram depicting a program module designated as a Get First module that calculates a first rule occurrence defined by a rule.
Figure 3B:
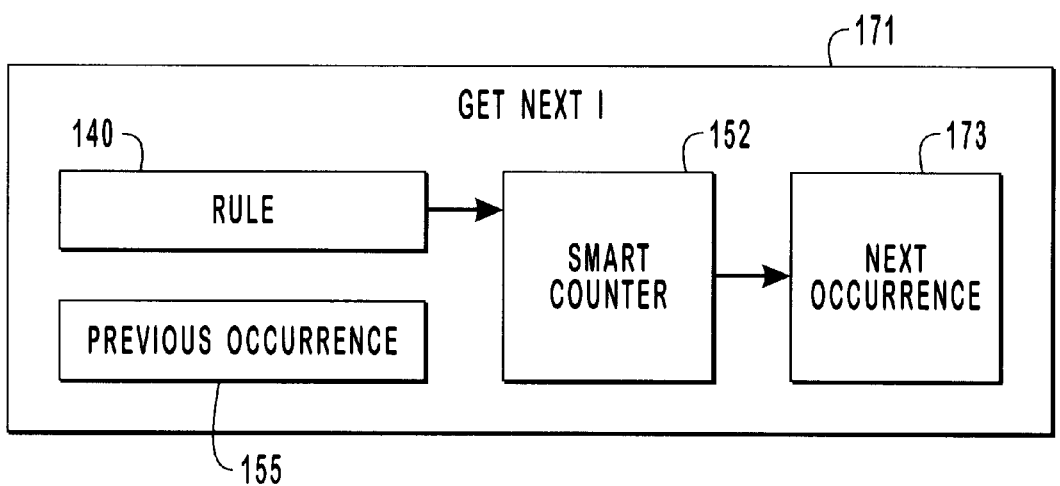
FIG. 3b is a schematic diagram illustrating a program module designated as a Get Next module that calculates successive rule occurrences after the first rule occurrence has been generated.

Before proceeding to a full discussion of systems and methods for calculating or generating times associated with event occurrences defined by an overall event expression, reference is made to FIGS. 3a and 3b, which illustrate program modules for identifying a first rule occurrence associated with a rule and successive rule occurrences thereafter. While the invention for calculating or generating times associated with event occurrences can be practiced using other techniques for identifying first rule occurrences and successive rule occurrences thereafter, it has been found that the program modules of FIGS. 3a and 3b efficiently use computing resources. The role that the first rule occurrences and successive rule occurrences thereafter play in generating event occurrences defined by an overall event expression will be more fully described below.

FIGS. 3a and 3b illustrate the operation of two related program modules designated as Get_First_I 170 and Get_Next_I 171. Get_First_I 170 is used calculate the first rule occurrence associated with a rule 140 which may be an affirmative rule or an exception. Thereafter, Get_Next_I 171 calculates successive rule occurrences. As shown in FIG. 3a, in order to generate first occurrence 172, smart counter 152 has rule 140 and pattern start date 154 as inputs. When Get_First_I 170 is called by the present invention, there are two dates of importance. The first is the start date of the time window specified by the user and the second is the pattern start date associated with the limits field of rule 140. When the present invention seeks the first occurrence of rule 140, Get_First_I 170 simply returns the pattern start date as first occurrence 172.

The start date of the time window is used as a reference for first occurrence 172 and next event occurrences 173 produced by Get_First_I 170 and Get_Next_I 171, respectively. For purposes to be explained later in the discussion, a numeric identifier, whose value is zero, is assigned to the start date of the time window. The numeric identifier is a number and represents the distance or time between event occurrences as well as between the start date of the time window and a particular event occurrence. The numeric identifier can be expressed in seconds, days or any other suitable manner. If the numeric identifier is expressed, for example, in seconds and first occurrence 172 occurs one hour after the start date of the time window, then first occurrence 172 has a numeric identifier of 3600. If next occurrence 173 occurred an hour after the first occurrence, then next occurrence 173 would have a numeric identifier of 7200. The numeric identifiers provide an easy means of referencing and comparing event occurrences. In view of the foregoing, the numeric identifier can be properly described as specifying a "time" at which the associated rule occurrence takes place.

In the context of Get_Next_I 171, smart counter 152 is more complex and robust. Previous occurrence 155 is always the last occurrence, which may have been generated by Get_First_I 170 or Get_Next_I 171. Smart counter 152 takes into account the start date of the time window provided by the user and previous occurrence 155. One purpose of smart counter 152 is to preserve processor time and increase efficiency. For example, if a rule specifies an hourly frequency, but has a restriction that limits event occurrences to November, it would waste processor time and decrease efficiency to simply increment the counter by an hour until November is reached. Rather, processor time is more effectively used and efficiency is increased if smart counter 152 jumps ahead to November before returning to hourly increments. In order to accomplish this objective, smart counter 152 takes restrictions 148 specified in rule 140 into account when calculating or computing the next occurrence. Restrictions 148 of rule 140 are therefore key in determining next occurrence 173.

Smart counter 152 uses two properties of rule 140 to advance to next occurrence 173. An example will illustrate the method used by smart counter 152 in one embodiment. Assume we have rule 140 with a frequency of daily and the restrictions: seconds of minute are 20, 23 and 30; minutes of hour are 3 and 5; hours of day are 19 and 20; day of week is Saturday; week of month is 4; and month of year is 11. Smart counter 152 looks for restrictions with a granularity higher than the frequency of rule 140. In this example, the frequency is daily and rule 140 has three restrictions with higher granularity: seconds of minute, minutes of hour, and hours of day.

The restrictions having a granularity higher than that of the frequency of rule 140 are traversed from the restriction with the highest granularity to the lowest granularity. Using the above example, the restrictions listed imply that the seconds, minutes and hours must be certain seconds, minutes and hours. Smart counter 152 increments as follows (using a format of hh:mm:ss): 19:03:20 to 19:03:23 to 19:03:30 to 19:05:20 to 19:05:23 to 19:05:30 to 20:03:20 to 20:03:23 and so on. In effect, smart counter operates as an odometer that counts through lower granularity increments before advancing through a higher granularity increment.

Once the restrictions with higher granularity are exhausted and the next lowest granularity is the same granularity as the frequency of rule 140, then the interval of rule 140 is multiplied by the time duration indicated by the frequency and the result is added to the occurrence. Next, the present invention ensures that the new occurrence satisfies the conditions imposed by the restrictions with lower granularity than the frequency of the rule. If the restrictions with lower granularity are not satisfied, the occurrence is incremented by the interval of rule 140 times the time duration indicated by the frequency until all restrictions are satisfied or the occurrence falls outside the time window indicated by the user. In this manner, Get_First_I 170 and Get_Next_I 171 calculate successive rule occurrences associated with rule 140.

In view of the foregoing, the first rule occurrence (i.e., an occurrence identified by a "Get First" program module represents a special case of the set of next rule occurrences. In particular, the first rule occurrence is the rule occurrence that has the earliest corresponding time and date within the specified time window. Accordingly, the term "next rule occurrence" as used in the appended claims shall be understood to include the first rule occurrence associated with a particular rule.

Date and Time Calculation

In view of the foregoing discussion of suitable event expressions that can be used with the invention and the example of the techniques for generating the first and successive rule occurrences, the description of the invention will now proceed to methods and systems for generating or calculating times of event occurrences defined by an event expression. Times of event occurrences can be calculated, for example, in response to a request made by a user of a computer program.

FIGS. 4–7 illustrate one embodiment of the systems and methods for calculating all event occurrences defined by an event expression within a time window. For purposes of illustration, the general discussion of the embodiment depicted in FIGS. 4–7 will be supplemented with a description of how the invention can be applied to the following specific event expression:

E4) On the network server A, hourly on every third Friday of the month and at 10:00 a.m. on every Monday, except those that occur at 5:00 p.m. of any day and those that occur on the $21^{th}$ of the month. Beginning Dec. 14, 1998, until the year 2010. Those that occur at 2:00 a.m. and 4:00 a.m. shall instead occur on network server B. Add the occurrence on Dec. 22, 1998 at 10:00 a.m.

The method begins by parsing an event expression (e.g., event expression E4) in parser 62. Parser 62 divides the affirmative rules and exceptions of the event expression into three groups: add rule group 64, modify rule group 70 and delete rule group 76.

Referring to the example of event expression E4, add rule group 64 includes the following rules and exceptions:

R10) Hourly on every third Friday of the month

R11) At 10:00 a.m. on every Monday

R12) Dec. 22, 1998 at 10:00 a.m.

Similarly, modify rule group 70 includes, in this example:

R13) Those that occur at 2:00 a.m. and 4:00 a.m. shall instead occur on network server B.

Delete group 76 includes

R14) At 5:00 p.m. of any day

R15) On the $21^{th}$ of the month

Figure 4:
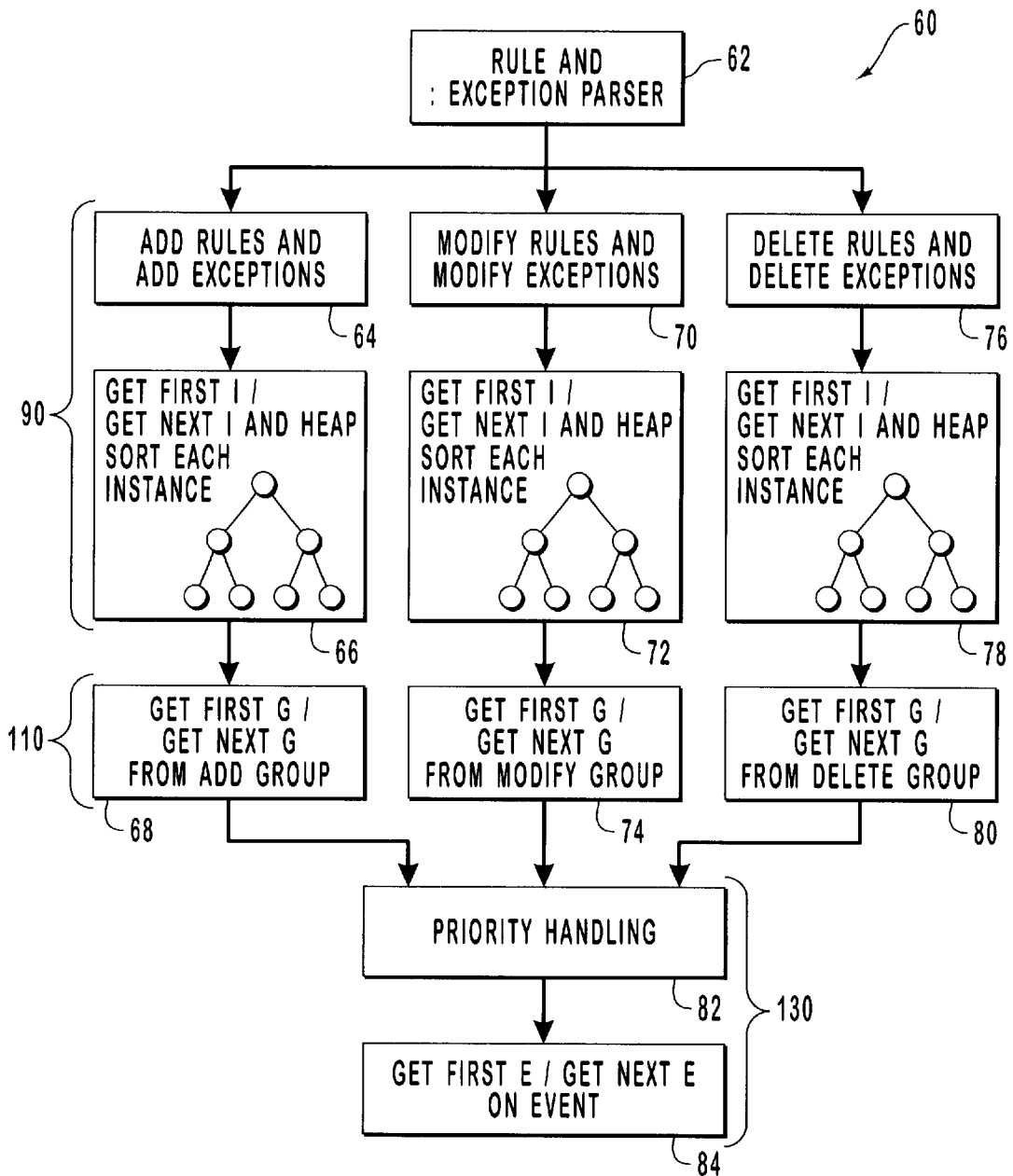
FIG. 4 is a diagram illustrating one embodiment of the methods of the invention, in which successive event occurrences defined by an overall event expression are calculated.

With the affirmative rules and exceptions divided into rule groups as presented above, level 90 of FIG. 4 performs the functions of calculating the first rule occurrence for each of the affirmative rules and exceptions and sorting the calculated rule occurrences in each rule group. Calculating the first rule occurrence can be performed according to the technique disclosed above in reference to FIGS. 3*a* and 3*b*.

For instance, in level 90, Get_First_I 170 and Get_Next_I 171 of FIGS. 3*a* and 3*b* can be invoked by step 66 on the rules in add rule group 64, by step 72 on the rules in modify rule group 70, and by step 78 on the rules in delete rule group 76. Step 66, step 72 and step 78 sort the rule occurrences that are returned by Get_First_I 170 and Get_Next_I 171. Sorting can be performed by any desired sorting algorithm. One example of a sorting algorithm that has been found to be suitably efficient in many cases is a heap sort algorithm that is well known in the art. Heap sort algorithms, like other sorting algorithms that can be used, advantageously sort the rule occurrences chronologically such that the earliest rule occurrence is readily available. Heap sorting is but one approach to sorting the rule occurrences in each group, and the invention can be practiced with other sorting algorithms and modules.

Turning now to the example of event expression E4, the first rule occurrence associated with each of the rules and exceptions is calculated. Specifically, step 66 receives, respectively, as the first add rule occurrences associated with rules R10, R11, and R12: Dec. 18, 1998 12:00 a.m.; Dec. 14, 1998 10:00 a.m.; and Dec. 22, 1998 10:00 a.m. These add rule occurrences are then sorted chronologically. Similarly, step 72 receives Dec. 14, 1998 2:00 a.m. as the first modify rule occurrence associated with rule R13. Note that the first rule occurrence associated with rule R13 is the time and date that satisfy the definition of rule R13, and not necessarily the first date and time that would coincide with an add rule occurrence. The same observation applies to the first delete rule occurrences. Because there is only one rule occurrence received by step 72, sorting is trivial. Step 78 receives, respectively, as the first delete rule occurrences associated with rules R14 and R15: Dec. 14, 1998 5:00 p.m.; and Dec. 21, 1998. These rule occurrences are then sorted chronologically.

At this point in the method, it is noted that step 66 has now identified the first rule occurrence that is a candidate to be an event occurrence satisfying the overall event expression. In particular, step 66 has determined that the first rule occurrence associated with an add rule is Dec. 14, 1998 10:00 a.m. (rule R11). This rule occurrence will be an event occurrence satisfying the overall event expression if it does not coincide with a rule occurrence associated with the delete rule group or the modify rule group. Accordingly, the method next includes steps that compare the first rule occurrence (and successive rule occurrences) associated with the add rule group with rule occurrences associated with the delete rule group and the modify rule group.

According to this embodiment, the technique for comparing the rule occurrences associated with the add rule group with rule occurrences associated with the delete rule group and the modify rule group proceeds as follows. In level 110 of FIG. 4, step 68 invokes a program module designated herein as Get_First/Next_G on the add group heap formed in step 66. Get_First/Next_G returns the top node of the add group heap, which represents the first add rule occurrence that is a candidate to be an event occurrence satisfying the overall event expression. Moreover, the value of the top node of the add group heap is the earliest add rule occurrence chronologically. Returning a top node of a heap formed by a heap sorting process is known as "popping" the heap. Step 74 performs a similar function on the modify rule group heap formed in step 72. Step 80 repeats the action with the delete rule group heap formed in step 78.

Note that the add group heap has as many nodes as there are add rules, the modify heap has as many nodes as there are modify rules, and the delete heap has as many nodes as there are delete rules. When the heaps are initially filled by calling Get_First/Next_I on groups 64, 70 and 76, each node in each heap is associated with a particular rule. This information is remembered for bookkeeping purposes and becomes relevant when the heaps are popped by steps 68, 74 and 80. When the heap is popped, Get_First/Next_I is called for the rule associated with the node that was popped and the heap resorts itself such that the earliest event occurrence is again on top of the heap. This ensures that the next earliest event occurrence will be returned when Get_First/Next_G is called again.

Returning to the example of event expression E4, step 68 pops the add group heap by retrieving the add rule occurrence Dec. 14, 1998 10:00 a.m. After the add rule heap is popped, Get_Next_I 71 operates on rule R11 (e.g., the rule associated with the popped node) to yield the next rule occurrence associated with rule R11. This next rule occurrence is Dec. 21, 1998 10:00 a.m. The add group heap now includes Dec. 18, 1998 12:00 a.m.; Dec. 21, 1998 10:00 a.m.; and Dec. 22, 1998 10:00 a.m., which are chronologically ordered in the heap according to their start times. Thus, the next earliest rule occurrence occupies the next node to be popped from the add group heap. Likewise, step 74 pops the modify group heap by retrieving the modify rule occurrence Dec. 14, 1998 2:00 a.m. Get_Next_I 171 then operates on rule R13 to yield Dec. 14, 1998 4:00 a.m. Sorting the modify group heap, which has a single node, is trivial. Step 80 pops the delete group heap by retrieving Dec. 14, 1998 5:00 p.m. Get_Next_I 171 then operates on rule R14 to yield Dec. 15, 1998 5:00 p.m. The delete group heap now includes Dec. 15, 1998 5:00 p.m. and Dec. 21, 1998.

Priority handling module 82 of level 130 compares the add rule occurrence retrieved by step 68 with the modify rule occurrence and the delete rule occurrence retrieved by steps 74 and 80, respectively, according to a defined set of priority rules. The priority rules define the protocol for modifying or deleting the add rule occurrence when it coincides with a modify rule occurrence or a delete rule occurrence. The following is a summary of the priority rules that can be sequentially applied to add rule occurrences according to one embodiment of the invention, wherein "A" represents an add rule occurrence, "M" represents a modify rule occurrence, and "D" represents a delete rule occurrence.

1) If A=D, discard A;
2) If A<D, compare A with M;
   a) If A<M, A is a valid event occurrence;
   b) If A=M, M is a valid event occurrence,
   c) If A>M, continue retrieving a next rule M until 2a or 2b is satisfied or until there are no more rules M in the time window;
      i) If there are no more rules M in the time window, A is a valid event occurrence;
3) If A>D, continue retrieving a next rule D until 1 or 2 is satisfied or until there are no more rules D in the time window;
   a) If there are no more rules D in the time window, A is a valid event occurrence.

The operators "=", "<", and ">" relate to a comparison of the start times of the respective rule occurrences. In other words, the priority rules define a process for determining whether the start times of the add rule occurrences coincide with, precede, or follow the start times of the modify rule occurrences and the delete rule occurrences. If the start time of the add rule occurrence under consideration does not coincide with the start time of a modify rule occurrence or a delete rule occurrence, the add rule occurrence is a valid event occurrence. Any add rule occurrences or modify rule occurrences that are found to satisfy the event expression constitute the output of Get_First/Next_E module 84 of FIG. 4.

After an add rule occurrence "A" is compared using the priority rules, the add rule heap is updated and the next earliest add rule occurrence is processed, so long as there is another add rule occurrence in the time window. According to the foregoing priority rules used by priority handling module 84, if an add rule occurrence matches a modify rule occurrence according to rule 2(b), both the add group heap and the modify group heap are updated by calling Get_Next_I for the appropriate rules in preparation for the subsequent iteration. Likewise, if an add rule occurrence matches a delete rule occurrence according to rule (1), both the add group heap and the delete group heap are updated. Otherwise, unless the modify group heap is popped according to rule 2(c) or the delete group heap is popped according to rule (3), the top node of the modify group heap and the delete group heap are retained to be compared with the next earliest add rule occurrence during the subsequent iteration.

Referring again to the example of event expression E4, the add rule occurrence Dec. 14, 1998 10:00 a.m. is processed by priority handling module 82 using the priority rules. In this case, priority rule 2a is immediately satisfied, and Dec. 14, 1998 10:00 a.m. is a valid event occurrence. The next add rule occurrence popped from the add group heap is Dec. 18, 1998 12:00 a.m. Priority handling module 82 determines that priority rule 2c initially applies to the add rule occurrence Dec. 18, 1998 12:00 a.m. In particular, this add rule occurrence postdates the modify rule occurrence, Dec. 14, 1998 2:00 a.m. that is currently held by step 74. Accordingly, the next modify rule occurrences are generated and popped until priority rule 2a or 2b is satisfied. Eventually, add rule occurrence Dec. 18, 1998 12:00 a.m. is compared with modify rule occurrence Dec. 18, 1998 2:00 a.m., thereby satisfying priority rule 2a, with the result that add rule occurrence Dec. 18, 1998 12:00 a.m. is a valid event occurrence satisfying the overall event expression.

After several more iterations, step 68 retrieves a next add rule having the value Dec. 18, 1998 2:00 a.m. When priority handling module 82 applies the priority rules, it determines according to priority rule 2b that modify rule Dec. 18, 1998 2:00 a.m., having a property "network server B," is a valid event occurrence. This example illustrates how a modify rule can specify an event that satisfies the overall event expression.

After more iterations, one of the delete rule occurrences eventually overrules an add rule occurrence. In particular, step 68 retrieves an add rule occurrence associated with rule R10 having the value Dec. 18, 1998 5:00 p.m. Priority handling module 82 executes the priority rules on this add rule occurrence and determines that priority rule 1 applies. In particular, step 80 retrieves a next delete rule occurrence associated with exception R14 having the value Dec. 18, 1998 5:00 p.m. Because this value coincides with the current add rule occurrence, the add rule occurrence is discarded, and is determined not to be a valid event occurrence. It can be understood that this is the appropriate result, since, referring to event expression E4, it is noted that the expression provides that the event is not to occur at 5:00 p.m. of any day. Thus, this example shows that the invention appropriately responds to exceptions defined in event expressions when calculating times and dates that satisfy the event expressions.

Note that the method illustrated in FIG. 4 proceeds through the specified time window chronologically and evaluates every rule occurrence associated with the rules. After the three heaps are filled with the first occurrences, Get_Next_I 171 is only invoked on one rule at a time. In other words, if the event occurrence output by priority handling module 82 and Get_First/Next_E 84 is valid, then Get_First/Next_G is invoked on the heap that supplied that event occurrence and Get First/Next I is invoked on the rule associated with the node that was popped from the heap. This process is repeated until all valid event occurrences within a specified time window are enumerated.

Figure 5:
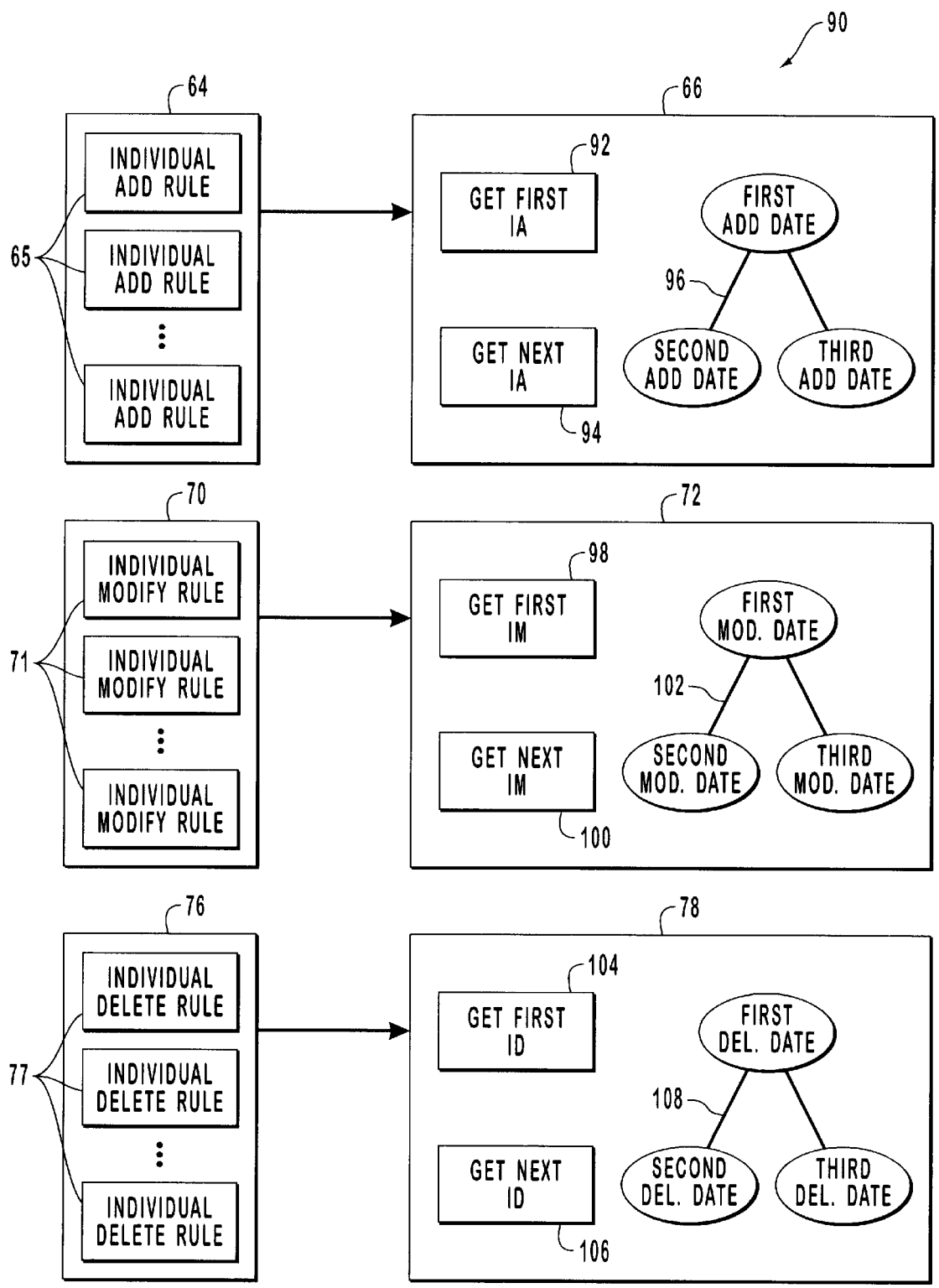
FIG. 5 is a graphical depiction of the techniques for calculating the first and subsequent rule occurrences for individual rules, and represents an intermediate step of the method of FIG. 4.

FIG. 5 is a more detailed view of level 90 in FIG. 4. In FIG. 5, the event expression has been parsed and separated into separate groups. Add rule group 64 contains individual add rules 65. Modify rule group 70 contains individual modify rules 71 and delete rule group 76 contains individual delete rules 77. It is not necessary that each group contain rules or exceptions, but an event expression must comprise at least one rule.

Once the rules have been grouped as shown in level 90, Get_First_IA 92 is invoked on each add rule 65, Get_First_M 98 is invoked on each modify rule 71 and Get_First_ID 104 is invoked on each individual delete rule or exception 77. Get_First_IA 92, Get_First_IM 98 and Get_First_ID 104 operate in the same manner as Get_First_I 170 illustrated in FIG. 3a. The names are different for illustrative purposes only, although another embodiment of the present invention contemplates separate routines for each group of rules. Get_First_IA 92 returns the first event occurrence associated with each add rule 64 and places the corresponding first event occurrences in add heap 96. Add heap 96 sorts the first event occurrences with the earliest chronological first event occurrence on top of add heap 96. Each node of add heap 96 is associated with a particular individual add rule 65. When the top node of add heap 96 is popped in level 110, illustrated in FIG. 4, Get_Next_IA 94 is invoked on that particular rule. Get_Next_IA 94 will return a next event occurrence for that particular rule and that next event occurrence is inserted in add heap 96. Add heap 96 automatically resorts itself such that the earliest add event occurrence is on top.

A similar process occurs for modify group 70. Get_First_IM 98 returns the first event occurrence associated with each modify rule 71 and places the corresponding first event occurrences in modify heap 102. Modify heap 102 sorts the first event occurrences with the earliest chronological first event occurrence on top of modify heap 102. Each node of modify heap 102 is associated with a particular individual modify rule 71. When the top node of modify heap 102 is popped in level 110, illustrated in FIG. 4, Get_Next_IM 100 is invoked on that particular rule. Get_Next_IM 100 will return a next event occurrence for that particular rule and the next event occurrence is inserted in modify heap 102. Modify heap 102 automatically resorts itself such that the earliest modify event occurrence is on top.

A similar process occurs for delete rule group 76. Get_First_ID 104 returns the first rule occurrence associated with each delete rule 77 and places the corresponding rule occurrences in delete heap 108. Delete heap 108 sorts the first rule occurrences with the earliest chronological first rule occurrence on top of delete heap 108. Each node of delete heap 108 is associated with a particular individual delete rule 77. When the top node of delete heap 108 is popped in level 110, illustrated in FIG. 4, Get_Next_ID 106 is invoked on that particular rule. Get_Next_ID 106 will return a next rule occurrence for that particular rule and the next rule occurrence is inserted in delete heap 108. Delete heap 108 automatically resorts itself such that the earliest delete rule occurrence is on top.

In this manner add heap 96, modify heap 102 and delete heap 108 are kept full and the earliest rule occurrence for each group of rules is on top of the respective heap. If Get_First_IA 92, Get_Next_IA 94, Get_First_IM 98, Get_Next_IM 100, Get_First_ID 104, or Get_Next_ID 106 returns an occurrence that is outside of the indicated time window, the rule occurrence is discarded and the rule associated with the particular rule is no longer queried and the respective heap is resorted having one less node.

Figure 6:
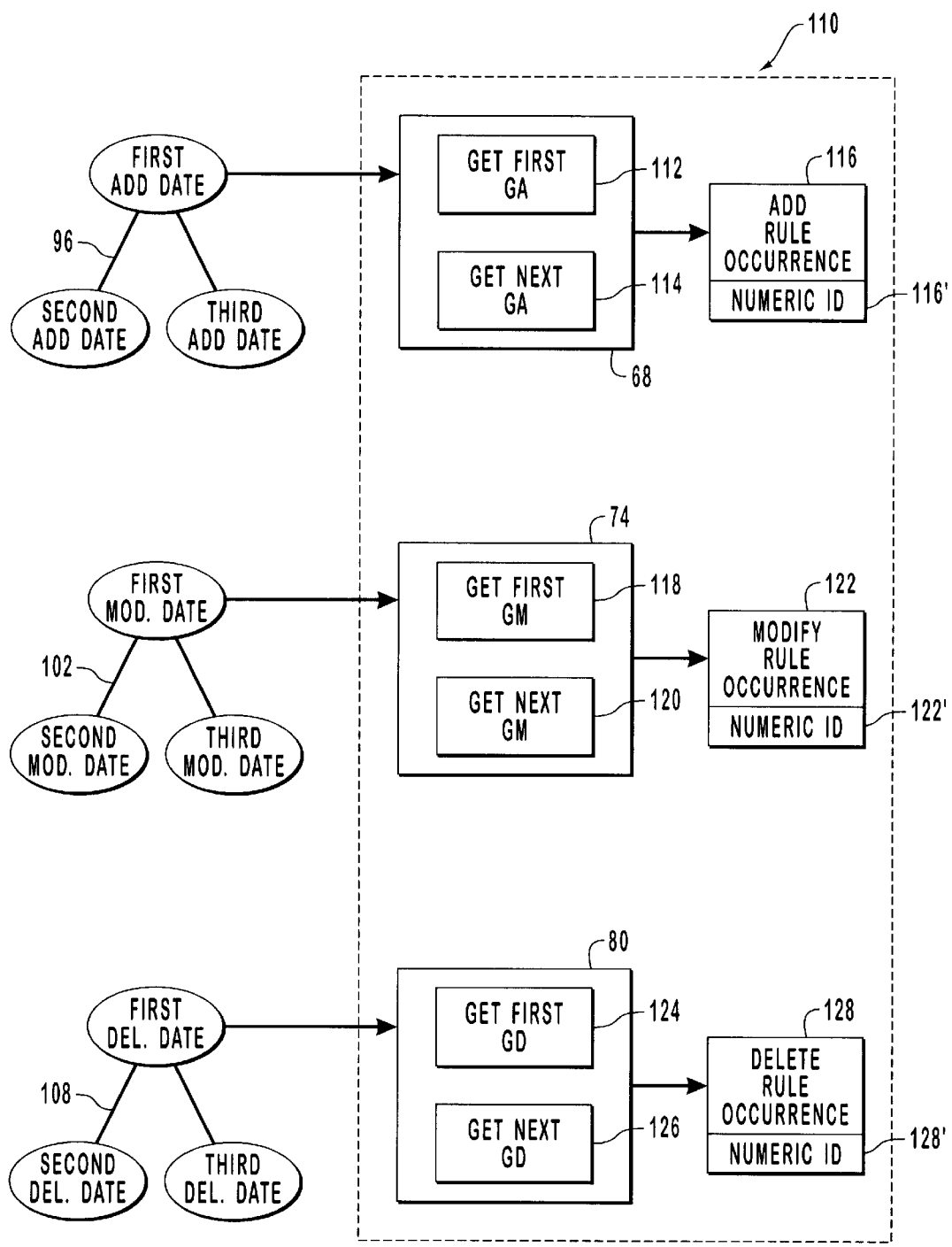
FIG. 6 is a graphical depiction of the techniques for identifying the first and subsequent rule occurrences associated with the add group, the modify group, and the delete group, and represents an intermediate step of the method of FIG. 4.

FIG. 6 is a detailed illustration of level 110, previously shown in FIG. 4. FIG. 6 also shows add heap 96, modify heap 102 and delete heap 108. Once the first rule occurrence for each rule has been determined and placed in the respective heap, level 110 is invoked. Level 110 comprises a second tier of get first/next routines which have the effect of returning a first/next rule occurrence, but function quite differently from the get first/next routines illustrated in FIGS. 3a, 3b, and 5.

Get_First_GA 112 pops the top node of add heap 96. Because this is the first time a node has been popped from add heap 96, it is not a duplicate and Get_First_GA 112 outputs add group rule occurrence 116. Get_First/Next_G 68 remembers the last value of add group rule occurrence 116. For bookkeeping purposes, each rule occurrence in each node of each heap can be associated with a numeric identifier that can be seen as representing the time of the rule occurrence. For example, the numeric identifiers can be assigned to rule occurrences in an ascending numeric order that corresponds to an ascending chronological order of the dates and times of the rule occurrences. If two add rule occurrences have the same date and time, they also have the same numeric identifier. The numeric identifiers provide a convenient technique for comparing rule occurrences and eliminating duplicate add rule occurrences. As shown in FIG. 6, add group rule occurrence 116 is associated with numeric identifier 116', modify group rule occurrence 122 is associated with numeric identifier 122' and delete group rule occurrence 128 is associated with numeric identifier 128' in this embodiment of the invention.

When the top node of a heap is popped, the numeric identifier is remembered by the present invention. If the numeric identifier of the rule occurrence popped next from the heap is the same as the numeric identifier remembered, the popped rule occurrence is discarded, get next is called for the particular rule, the heap is resorted and popped again. This process permits duplicate rule occurrences to be eliminated. Preferably the process of removing duplicates occurs at level 110 with Get_First/Next_GA 68, Get_First/Next_GM 74 and Get_First/Next_GD 80.

The next time a rule occurrence is needed from add heap 96, Get_Next_GA 114 is invoked to pop the heap and compare the numeric identifier of that node with the numeric identifier of the previous rule occurrence. If there is no duplicate, then Get_Next_GA outputs next add group rule occurrence 116.

A similar procedure occurs with Get_First_GM 118, Get_Next_GM 120, Get_First_GC 124 and Get_Next_GD 126. Each of these routines pops the top node of either modify heap 102 or delete heap 108. If the popped rule occurrences are not duplicates, they are output as first/next modify group rule occurrence or first/next delete group rule occurrence. Each node popped from each heap is replaced as described above.

Figure 7:
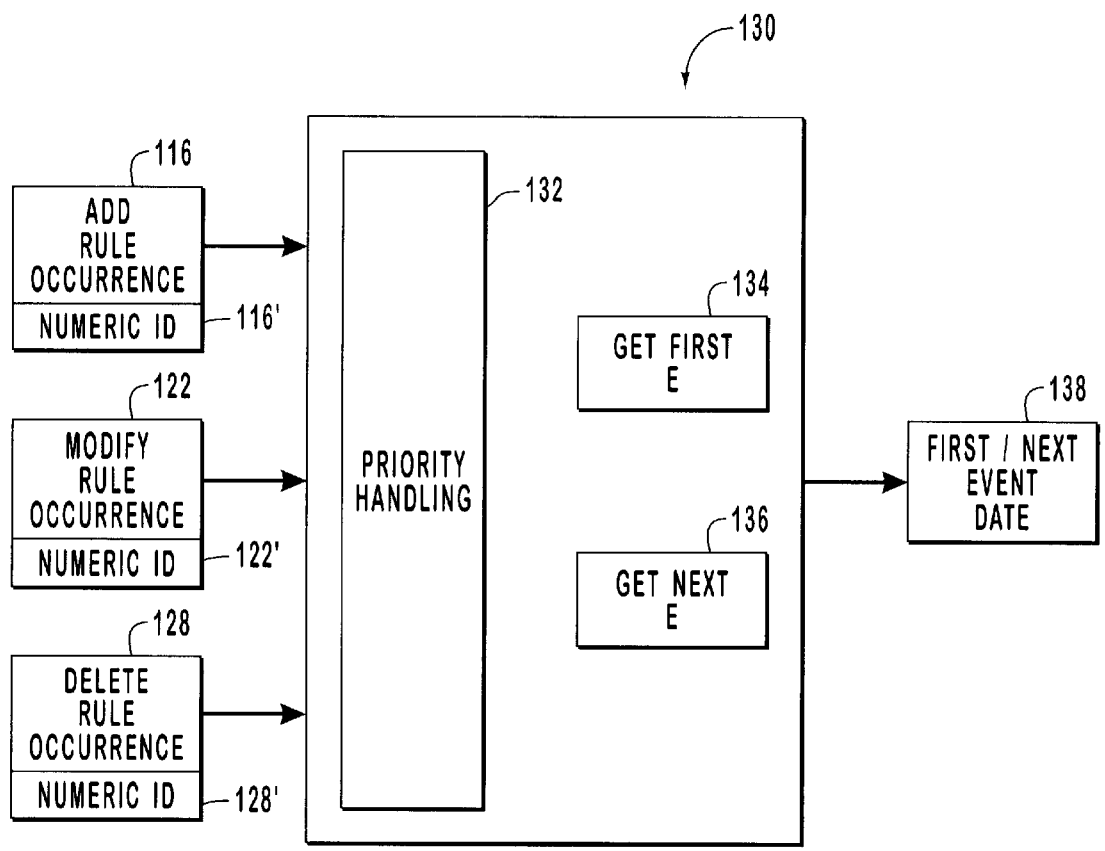
FIG. 7 is a graphical depiction of the techniques for applying priority rules to the rule occurrences identified according to FIG. 6.

FIG. 7 is an illustration of level 130, also illustrated in FIG. 4. Level 130 implements priority handling 82 which is invoked when Get Next/First GA 68, Get_First/Next_GM 74 and Get_First/Next_GD 80, all illustrated in FIG. 6, have produced first/next add group rule occurrence 116, first/next modify group rule occurrence 122 and first/next delete group rule occurrence 128. These three rule occurrences are evaluated with priority handling module 82 in combination with Get_First_E 134 and Get_Next_E 136. Get_First_E 134 invokes priority handling 132 on the three indicated rule occurrences. The rule occurrences produced by the add group and the delete group are compared first because deletes have higher priority than modifies. Because each rule occurrence is represented by a numeric identifier in the preferred embodiment, priority handling 132 is a matter of comparison.

Priority handling module 82 can apply the priority rules described in reference to FIG. 4 by comparing the numeric identifiers of the rule occurrences in the following manner. If numeric identifier 116' is less than numeric identifier 128', numeric identifier 116' is then compared with numeric identifier 122'. If numeric identifier 116' is less than numeric identifier 122', Get_First_E 134 or Get_Next_E 136 returns, as a valid event occurrence 138, add occurrence 116. If numeric identifier 116' is equal to numeric identifier 122', add occurrence 116 is discarded and Get_First_E 134 or Get_Next_E 136 returns, as a valid first/next event occurrence 138, modify occurrence 122. If numeric identifier 116' is greater than numeric identifier 122', then Get_Next_GM 120 is invoked to get a new modify group rule occurrence 122 until numeric identifier 116' is less than or equal to numeric identifier 122'. If the next modify occurrence 122 returned by Get_Next_GM 118 is outside the specified time window, then Get_First_E 134 or Get_Next_E 136 returns add occurrence 116 as a valid first/next event occurrence 138.

If numeric identifier 116' is greater than numeric identifier 128', then Get_Next_GD 126 is invoked until numeric identifier 128' is greater than or equal to numeric identifier 116', in which case the above process is repeated. If delete occurrence 128 is outside of the specified time window, then Get_First_E 134 or Get_Next_E 136 returns add occurrence 116 as a valid event occurrence 138. Priority handling module 82 repeated the process in this manner until numeric identifier 116' returned by Get_Next_GA 114 is outside of the specified time window. In this manner, all valid event occurrences defined by an event expression are identified.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for identifying event occurrences that are specified by an event expression comprising the steps of:

obtaining rules that are associated with the event expression and are classified into groups that include an add rule group and a delete rule group, wherein the rules include one or more add rules that are classified into the add rule group and one or more delete rules that are classified in the delete rule group;

identifying a next add rule occurrence for each of the one or more add rules, so as to generate one or more next add rule occurrences each associated with a time;

sorting the one or more next add rule occurrences in chronological order based on the associated times, the add rule occurrence that is earliest in the chronological order being identified as a candidate occurrence; and determining whether the candidate occurrence is an event occurrence satisfying the event expression, including performing the step of determining whether the candidate occurrence coincides with any delete rule occurrence associated with the one or more delete rules, wherein, if the candidate occurrence coincides with said any delete rule occurrence, the candidate occurrence is not an event occurrence that satisfies the event expression.

2. A method as defined in claim 1, wherein the step of obtaining the rules comprises the step of parsing the event expression into the rules.

3. A method as defined in claim 1, wherein the step of obtaining the rules comprises the step of classifying the rules into the groups.

4. A method as defined in claim 1, wherein the step of determining whether the candidate occurrence is an event occurrence comprises the steps of:

determining that the candidate occurrence is the event occurrence; and outputting data that designates the candidate occurrence as the event occurrence.

5. A method as defined in claim 4, wherein the step of outputting data comprises the step of transmitting the data to a computer application.

6. A method as defined in claim 1, wherein the groups further include a modify rule group and the rules further include one or more modify rules classified into the modify rule group, wherein the step of determining the whether the candidate occurrence is an event occurrence further comprises the step of determining whether the candidate occurrence coincides with any modify rule occurrence associated with the one or more modify rules.

7. A method as defined in claim 6, wherein the step of determining whether the candidate occurrence coincides with any modify rule occurrence comprises the steps of:

determining that the candidate occurrence coincides with a modify rule occurrence; and designating said modify rule occurrence that coincides with the candidate occurrence as the event occurrence.

8. A method as defined in claim 6, wherein the step of determining whether the candidate occurrence coincides with any modify rule occurrence comprises the steps of:

determining that the candidate occurrence does not coincide with any modify rule occurrence; and designating the candidate occurrence as the event occurrence.

9. A method as defined in claim 1, wherein the step of determining whether the candidate occurrence coincides with any delete rule occurrence comprises the steps of:

determining that the candidate occurrence does not coincide with any delete rule occurrence; and designating the candidate occurrence as the event occurrence.

10. A method as defined in claim 1, further comprising the step of iteratively:

replacing said next add rule occurrence that was earliest in the chronological order with another next add rule occurrence for the same add rule and associating a time with the other next add rule occurrence;

resorting the one or more next add rule occurrences in chronological order based on the associated times, the add rule occurrence that is earliest in the chronological order being identified as a candidate occurrence; and determining whether the candidate occurrence is an event occurrence satisfying the event expression.

11. A method for identifying event occurrences that are specified by an event expression comprising the steps of:

obtaining one or more rules that represent the event expression and are classified into one or more add rules in an add rule group, one or more modify rules in a modify rule group, and one or more delete rules in a delete rule group;

identifying a next add rule occurrence for each of the one or more add rules, so as to generate one or more next add rule occurrences each associated with a time;

sorting the one or more next add rule occurrences in chronological order based on the associated times, the add rule occurrence that is earliest in the chronological order being identified as a candidate occurrence; and comparing the candidate occurrence with a modify rule occurrence associated with the modify rule group, with a delete rule occurrence associated with the delete rule group or with the modify rule occurrence and the delete rule occurrence so as to determine whether the candidate occurrence is an event occurrence satisfying the event expression.

12. A method as defined in claim 11, further comprising the steps of:

identifying a next modify rule occurrence for each of the one or more modify rules, so as to generate one or more next modify rule occurrences each associated with a time;

sorting the one or more next modify rule occurrences in chronological order based on the times associated therewith;

identifying a next delete rule occurrence for each of the one or more delete rules, so as to generate one or more next delete rule occurrences each associated with a time; and sorting the one or more next delete rule occurrences in chronological order based on the times associated therewith.

13. A method as defined in claim 12, wherein the step of comparing the candidate occurrence comprises the steps of:

determining whether the candidate occurrence coincides with the delete rule occurrence that is earliest in the chronological order;

if the candidate occurrence does coincide with the earliest delete rule occurrence, then concluding that the candidate occurrence is not the event occurrence; and if the candidate occurrence is earlier than the earliest delete rule occurrence, then applying the modify rule occurrence to the candidate occurrence.

14. A method as defined in claim 13, wherein the step of applying the modify rule occurrence comprises the steps of:

determining whether the candidate occurrence coincides with the modify rule occurrence that is earliest in the chronological order;

if the candidate occurrence does coincide with the earliest modify rule occurrence, then designating the earliest modify rule occurrence as the event occurrence;

if the candidate occurrence is earlier than the earliest modify rule occurrence, then designating the candidate occurrence as the event occurrence; and if the candidate occurrence is later than the earliest modify rule occurrence, then iteratively identifying a next earliest modify rule occurrence until the candidate occurrence coincides with or is earlier than the next earliest modify rule occurrence.

15. A method as defined in claim 14, wherein the step of comparing the candidate occurrence further comprises the steps of:

determining that the candidate occurrence is later than the earliest delete rule occurrence;

iteratively identifying a next earliest delete rule occurrence until the candidate occurrence coincides with or is earlier than the next earliest delete rule occurrence;

if the candidate occurrence coincides with the next earliest delete rule occurrence, then concluding that the candidate occurrence is not the event occurrence; and if the candidate occurrence is earlier than the next earliest delete rule occurrence, then applying the modify rule occurrence to the candidate occurrence.

16. A method for identifying all event occurrences that are specified by an event expression and that fall within a prescribed time window, the method comprising the steps of:

a) obtaining one or more rules that represent the event expression and are classified into at least one group selected from an add rule group, a modify rule group, and a delete rule group;

b) computing a first rule occurrence for each rule for each at least one group;

c) sorting the first rule occurrences for each at least one group;

d) calculating for each at least one group a first group occurrence;

e) computing a next rule occurrence;

f) merging the first group occurrences from each at least one group to produce a first event occurrence;

g) calculating for each at least one group a next group occurrence;

h) merging the next group occurrences from each at least one group to produce a next event occurrence; and i) repeating steps g) and h) until all event occurrences within the prescribed time window are calculated.

17. A method as defined in claim 16 further comprising the step of sorting the first rule occurrences in at least one heap selected from an add heap, a delete heap, and a modify heap, wherein each node of each at least one heap corresponds to a separate rule.

18. A method as defined in claim 17 wherein the step of calculating a first group occurrence further comprises the step of popping a top node of each at least one heap.

19. A method as defined in claim 18 further comprising the step of replacing the top node of the at least one heap with a next rule occurrence produced by the rule associated with the node that was popped.

20. A method as defined in claim 16, wherein the step of computing a next rule occurrence further comprises the step of incrementing a previous rule occurrence by a rule restriction having a granularity higher than the granularity of the frequency of the rule.

21. A method as defined in claim 16, wherein the step of computing a next rule occurrence further comprises the step of incrementing a previous rule occurrence by an amount equal to the interval of the rule multiplied by a time period indicated by the frequency of the rule.

22. A method as defined in claim 16 wherein the step of merging the first group occurrences further comprises comparing the first group occurrences according to predefined priority rules to produce an event occurrence.

23. A method as defined in claim 16 further comprising comparing the next group occurrences according to predefined priority rules to produce an event occurrence.

24. A computer program product for implementing a method for identifying all event occurrences specified by an event expression and that fall within a specified time window, the computer program product comprising:
a computer-readable medium carrying computer-executable instructions for implementing the method wherein the computer-executable instructions comprise:
program code means for obtaining one or more rules that represent the event expression and are classified into one or more groups;
program code means for calculating rule occurrences defined by the one or more rules;
program code means for calculating a numeric identifier associated with each of the rule occurrences;
program code means for merging the rule occurrences, so as to produce a list of at least one event occurrence that satisfies the event expression.

25. A computer product as defined in claim 24 wherein the computer-executable instructions further comprise program code means for sorting the rule occurrences in each of the one or more groups according to the numeric identifier associated with each of the rule occurrences.

26. A computer product as defined in claim 25, wherein the program code means for merging the rule occurrences operate by comparing add rule occurrences with modify rule occurrences and delete rule occurrences according to predetermined priority rules.

27. A computer program product as defined in claim 24, wherein the program code means for obtaining the one or more rules comprises program code means for receiving the event expression from a user.

28. A computer program product as defined in claim 24, wherein the program code means for obtaining the one or more rules comprises program code means for parsing the event expression into the one or more rules.

29. A computer program product for implementing a method for identifying event occurrences specified by an event expression, the computer program product comprising:
a computer-readable medium carrying computer-executable instructions for implementing the method wherein the computer-executable instructions comprise:
program code means for obtaining rules that represent the event expression and are classified into groups that include an add rule group, a modify rule group, and a delete rule group, wherein the rules include one or more add rules that are classified into the add rule group, one or more modify rules that are classified into the modify rule group, and one or more delete rules that are classified into the delete rule group;
program code means identifying a next add rule occurrence for each of the one or more add rules, so as to generate one or more next add rule occurrences each associated with a time;
program code means for sorting the one or more next add rule occurrences in chronological order based on the associated times, the add rule occurrence that is earliest in the chronological order being identified as a candidate occurrence; and
program code means for determining whether the candidate occurrence is an event occurrence satisfying the event expression by comparing the candidate occurrence with a modify rule occurrence associated with the one or more modify rules and a delete rule occurrence associated with the one or more delete rules.

30. A computer program product as defined in claim 29, wherein the computer-executable instructions further comprise program code means for generating one candidate occurrence at a time.

31. A computer program product as defined in claim 30, wherein the computer-executable instructions further comprise program code means for producing another next rule occurrence for a particular add rule when a previous add rule occurrence associated with the particular add rule has been identified as the candidate occurrence.

32. A computer program product as defined in claim 29, wherein the computer-executable instructions further comprise program code means for successively generating candidate occurrences until a next candidate occurrence would fall outside a specified time window.

33. A method for identifying event occurrences that are specified by an event expression comprising the steps of:
obtaining rules that are associated with the event expression and are classified into one or more groups that include an add rule group and a modify rule group, wherein the rules include one or more add rules that are classified into the add rule group and one or more modify rules that are classified in the modify rule group;
identifying a next add rule occurrence for each of the one or more add rules, so as to generate one or more next add rule occurrences each associated with a time;
sorting the one or more next add rule occurrences in chronological order based on the associated times, the add rule occurrence that is earliest in the chronological order being identified as a candidate occurrence; and
determining whether the candidate occurrence is an event occurrence satisfying the event expression, including performing the step of determining whether the candidate occurrence coincides with any modify rule occurrence associated with the one or more modify rules, wherein, if the candidate occurrence coincides with said any modify rule occurrence, the candidate occurrence is not an event occurrence that satisfies the event expression.

* * * * *